United States Patent
Arling et al.

(10) Patent No.: US 9,100,612 B2
(45) Date of Patent: Aug. 4, 2015

(54) MEDIA RETURN SYSTEM

(75) Inventors: Paul D. Arling, Irvine, CA (US); Patrick H. Hayes, Mission Viejo, CA (US); John E. Hyatt, Palos Park, IL (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 0 days.

(21) Appl. No.: 12/904,766

(22) Filed: Oct. 14, 2010

(65) Prior Publication Data

US 2011/0033167 A1 Feb. 10, 2011

Related U.S. Application Data

(63) Continuation of application No. 12/240,294, filed on Sep. 29, 2008, now Pat. No. 7,821,419, which is a continuation of application No. 09/718,931, filed on Nov. 21, 2000, now abandoned.

(51) Int. Cl.
*H04N 5/44* (2011.01)

(52) U.S. Cl.
CPC ...................................... *H04N 5/44* (2013.01)

(58) Field of Classification Search
CPC ........................................................ H04N 5/44
USPC ............. 340/825.76, 825.22, 825.69, 825.72, 340/3.7, 3.71, 4.3, 4.31, 4.37, 4.4, 12.2, 340/12.5, 13.24, 12.23; 341/22, 175, 176; 348/734; 398/106, 107, 112; 386/234; 725/81

See application file for complete search history.

(56) References Cited

U.S. PATENT DOCUMENTS

| | | | | |
|---|---|---|---|---|
| 5,410,326 A * | 4/1995 | Goldstein | ...................... | 348/734 |
| 5,594,509 A * | 1/1997 | Florin et al. | ..................... | 725/43 |
| 5,648,813 A * | 7/1997 | Tanigawa et al. | ............. | 725/139 |
| 5,956,025 A * | 9/1999 | Goulden et al. | ............. | 715/716 |
| 5,959,539 A * | 9/1999 | Adolph et al. | ................. | 340/3.5 |
| 6,040,829 A * | 3/2000 | Croy et al. | .................... | 715/864 |
| 6,104,334 A * | 8/2000 | Allport | ........................ | 341/175 |
| 6,208,341 B1 * | 3/2001 | van Ee et al. | ................. | 715/716 |
| 6,255,961 B1 * | 7/2001 | Van Ryzin et al. | ............ | 340/3.1 |

* cited by examiner

*Primary Examiner* — Edwin Holloway, III
(74) *Attorney, Agent, or Firm* — Greenberg Traurig, LLP

(57) ABSTRACT

A system includes a consumer electronic device adapted to render a media content and a hand-held, portable device having a touch screen display, a transmitter, a receiver, and a processing unit. The processing unit of the hand-held, portable device uses data related to the media content received via the receiver to cause command icons related to rendering of the media content to be defined and displayed in the touch screen display and to cause the transmitter to transmit one or more commands for controlling a functional operation related to rendering of the media content by the consumer electronic device in response to a user interaction with one or more of the command icons caused to displayed in the touch screen display.

14 Claims, 19 Drawing Sheets

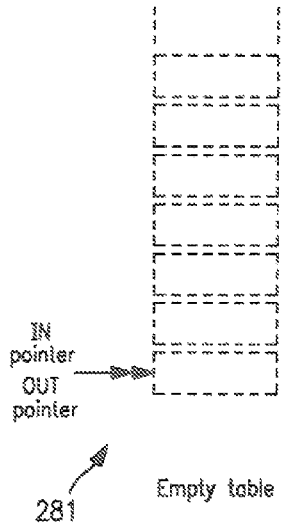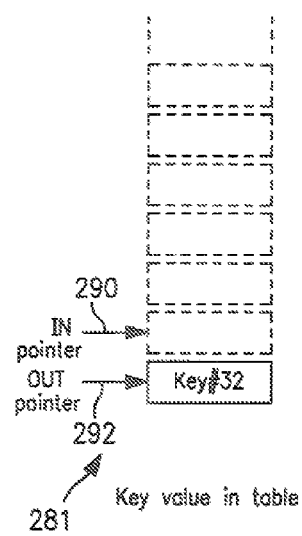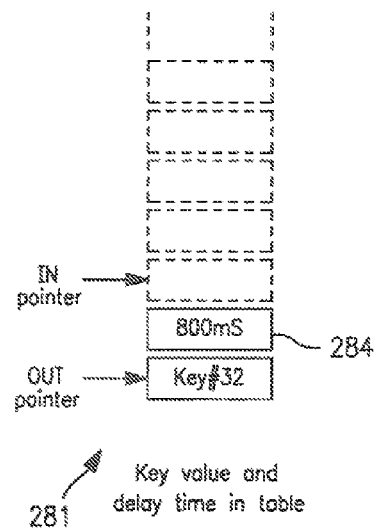
FIG. 15(a)   FIG. 15(b)   FIG. 15(c)
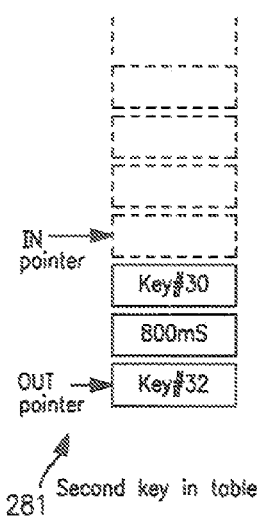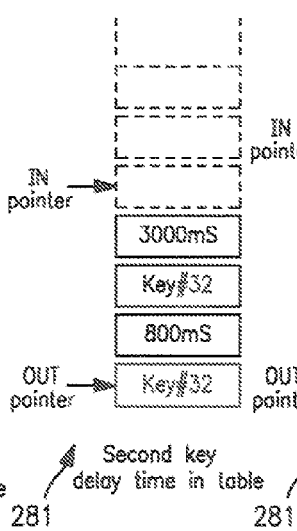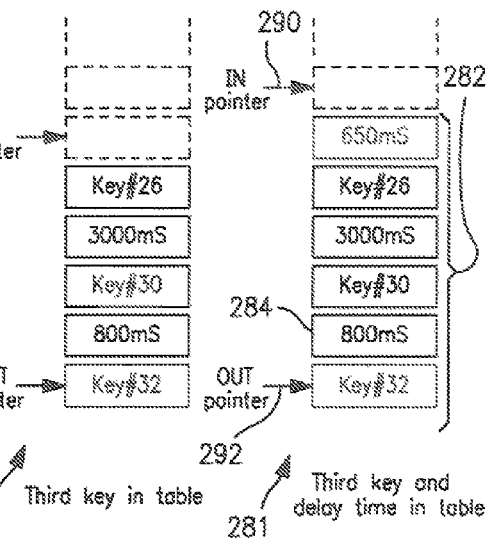
FIG. 15(d)   FIG. 15(e)   FIG. 15(f)   FIG. 15(g)

MEDIA RETURN SYSTEM

RELATED APPLICATION INFORMATION

This application is a continuation of U.S. application Ser. No. 12/240,294, filed on Sep. 29, 2008, which application is a continuation of U.S. application Ser. No. 09/718,931, filed on Nov. 21, 2000, which application is incorporated herein by reference in its entirety.

This application is also related to U.S. application Ser. No. 09/611,620, filed Jul. 6, 2000, which is now U.S. Pat. No. 7,079,113, which application was incorporated by reference in U.S. application Ser. No. 09/718,931.

FIELD OF THE INVENTION

The present invention relates to media systems, hand-held electronics and control modules. Specific exemplary embodiments discussed relate to remote controls and televisions.

BACKGROUND OF THE INVENTION

The description of art in this section is not intended to constitute an admission that any patent, publication, or other information referred to herein is prior art with respect to this invention, unless specifically designated as such.

Recently, cable television and broadcast television has become rife with commercials and other interruptions to the primary programming, or feature (referred to herein, separately and collectively, as commercials). While some commercials are amusing, they lose their appeal very soon. Changing channels during a commercial break, so-called "channel surfing" or simply "surfing" is at least as old as the first known remote control. With more and more channels to surf, a user is prone to become engrossed in the process of surfing itself and miss the primary feature he was viewing on the primary channel.

The prior art teaches a method of detecting commercials in a television to avoid video taping the commercials. During a television broadcast, when the program changes to a commercial, both the video and audio components of the composite television signal fade to a low amplitude level. Momentary loss of both the video and audio components at the beginning of each commercial may be used as an indicator of a commercial. U.S. Pat. No. 4,319,286, issued to Hanpachern describes in more detail a system for detecting fades in television signals to avoid recording from a commercial television broadcast. U.S. Pat. No. 4,319,286 is hereby incorporated by reference.

U.S. patents and applications relevant to remote control technology include U.S. Pat. Nos. 5,515,052; 5,255,313; U.S. patent application Ser. No. 09/418,091, filed Oct. 14, 1999, and U.S. patent application Ser. No. 09/611,620, filed Jul. 6, 2000, all of which are incorporated herein by reference. Patent '052 discloses a universal remote control with function syntheses. The remote control comprises driver circuitry for communicating code signal generation sequences, including a code generated command system, powered by a code setting signal; and memory for storing information therein. Patent '313 discloses a universal remote control system having a signal generator to transmit signals which will cause specific functions to occur in specific control devices. Pat. App. Ser. Nos. '091 and '620 disclose means and methods, inter alia, for operating a remote control. Application '620 discloses means and methods for interfacing, and navigating with secondary material on a removable digitally encoded medium. Application '620 also teaches means and methods for monitoring keystroke navigation sequences and other processes related to remote control technology.

Other U.S. patents related to remote control technology, and in particular relating to learning technology, include U.S. Pat. Nos. 4,959,810; 5,288,077; and 5,537,463, which are incorporated herein by reference. Patent '810 discloses means for transferring instructions to RAM wherein the instructions and/or data are transferred from a source external to the RAM. Patent '077 discloses a remotely upgradable universal remote control. Patent '463 discloses means in the remote control for picking up an electromagnetic signal for an electromagnetic signal source and storing output signal data in memory. The output signal data stored in memory may correspond to control function data, which may be transmitted to a device to be controlled.

U.S. Pat. No. 6,029,239 describes a remote control in which the user first enters one or more digits of channel number information and then presses a SEND key to transfer the channel change information to a TV set or Cable/satellite decoder box.

While the present invention relates to a wide variety of electronics and media systems, discussion of exemplary embodiments directed towards remote controls and televisions will facilitate understanding.

SUMMARY OF THE INVENTION

An object of the invention is to provide a television viewer who "channel surfs" during commercials with a mechanism to automatically return to the original channel at the conclusion of the commercial break. Thus, even if the viewer becomes engrossed in the alternate program content, he is still assured that his television will return to the original program at the appropriate time.

One possible implementation of this return to channel feature would be to build it into the television set in conjunction with a system capable of detecting advertising content (e.g., the system disclosed by Hanpachern in U.S. Pat. No. 4,319,286). An alternate implementation, for use in conjunction with existing TVs not so equipped, uses a timer in the remote control to approximate this feature. Other alternatives will be apparent from the teachings of this application.

For one application the present invention is directed toward a media system comprising a television with a tuner connected to receive a media transmission and to select a channel. A signal monitor is operably connected to monitor the transmission. Channel data may be stored in memory. A primary timer connected to the signal monitor may be reset to time predetermined intervals, e.g., 32 seconds, upon receipt of a predetermined signal indicator, e.g., a black frame or a generated signal from the signal monitor. Upon expiration of the predetermined interval, the tuner returns the system to the primary channel, i.e. it selects a channel corresponding to the channel data stored in memory.

The invention also comprises an embodiment directed towards a media system adapted to return to a user-selected channel. A signal monitor connected to a tuner of a television monitors a media signal (also referred to as media transmission) for a predetermined event. In response to the occurrence of the predetermined event, the timer begins timing a predetermined interval, or/and may be reset to time the predetermined interval. Stored in memory is programming that, in response to a user-initiated signal, initiates monitoring of the media signal for the predetermined event. In general, contemporaneously with the onset of the signal monitoring, the current channel is stored in memory. Upon expiration of the predetermined event, the programming provides for the return to the stored current channel. Preferably the user may initiate signal monitoring via a remote control. Such user-initiated signal may be, e.g., in response to a user depressing a button, or key, etc., on the remote control.

An object of the present invention is also to provide a remote control adapted to provide a return to channel feature for a television not equipped for a return to channel feature. Such a remote control may, e.g., comprise programming steps stored in memory for storing a primary channel indicator in memory in response to a user predetermined action, e.g., such as selecting a key. Programming also includes timing a predetermined interval in response to a second predetermined user action; and upon expiration of a predetermined interval, transmitting a signal that corresponds to an indicator of the primary channel to a media device. It will be understood that the second predetermined user action may be the same as the first predetermined user action, or it may be different yet similar, such as depressing the same key but for a longer duration, or it may be entirely different.

A method of effecting a return to a primary channel in a media device is taught herein. In one embodiment a primary channel, e.g., the channel or an indicator, is stored in device readable memory in response to the input of a user. The primary channel is monitored for a predetermined event indicative of a change in programming sources. Upon occurrence of, i.e., in response to, the predetermined event, a timer is initiated, or reset or both. Upon expiration of a predetermined interval, timed by the timer, the system is returned to the stored primary channel.

One method of monitoring the media channel comprises monitoring the primary channel for a predetermined event and notifying the user upon expiration of a predetermined interval. The predetermined interval was preferably initiated upon the occurrence of a predetermined event. Such notification may be achieved by exposing the user to either the audio or video component of the primary channel, or both. Other means for notification, such as a blinking light on the remote, as well as other audio and visual indicators may be used. It will be appreciated that although this document describes a method that results in an automatic return to the primary channel, it is also possible to implement either system to offer only an audible or visible reminder signal rather than an actual channel change.

Various embodiments directed toward a device readable medium are taught in the present invention. The device readable medium, depending on the application, may be located in the television, the remote control, a separate adapter, or a combination thereof. Such a device readable medium typically comprises programming steps for carrying out the desired application.

Other objects and advantages in accordance with the present invention will be apparent to those of skill in the art from the teachings disclosed herein.

BRIEF DESCRIPTION OF THE DRAWINGS

In the interest of enabling one of skill in the art to practice the invention, exemplary embodiments are shown and described. For clarity, details apparent to those of skill in the art without undue experimentation are generally omitted from the drawings and description.

FIGS. 15(a)-15(g) depict a key sequence table, similar to that shown in FIG. 12, changing as sequence values, including interkey values, are stored in the key sequence table.

DESCRIPTION OF EXEMPLARY EMBODIMENTS

Figure 1:
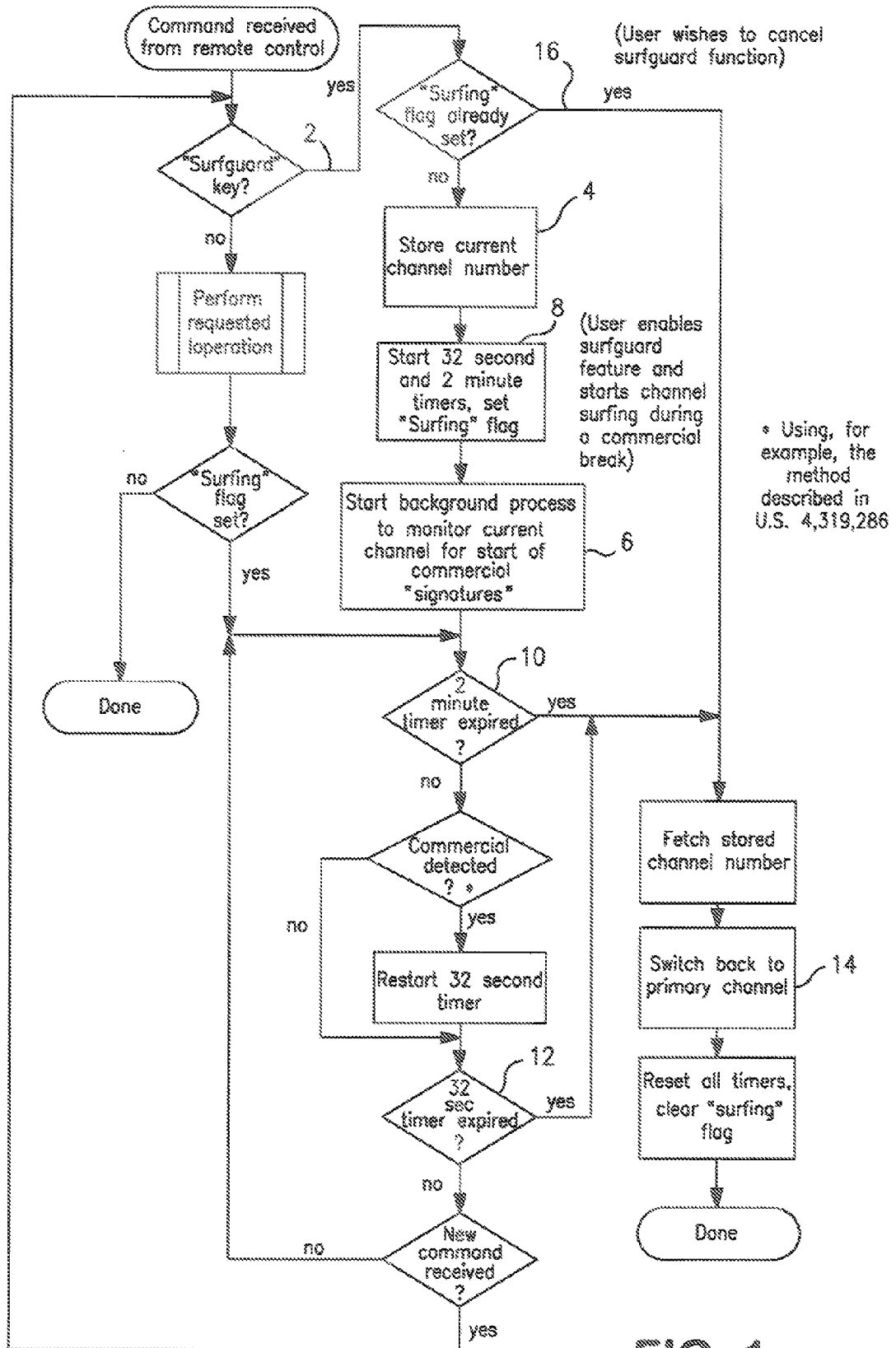
FIG. 1 is a flowchart depicting one method for implementing a television-based embodiment of the invention.

The present invention is discussed in relation to remote controls and televisions; however, other uses will be apparent from the teachings disclosed herein. The present invention will be better understood from the following detailed description of exemplary embodiments with reference to the attached drawings, wherein like reference numerals and characters refer to like parts, and by reference to the following claims.

Television Set-Based Implementation

Hanpachern (U.S. Pat. No. 4,319,286) teaches a method of detecting the start of a commercial by monitoring the received video and audio signals for a momentary absence of both picture and sound, the so-called "black frame" that typically results when the signal is switched from one program source to another.

When detected, this black frame occurrence is used to start a timer set to expire 32 seconds later. Since most TV commercials are seconds or less, each new commercial restarts the timer before it expires. Finally, 32 seconds after the end of the last commercial, the timer will expire. The period the timer is active can thus be used to signal the duration of a commercial break plus 32 seconds. An additional override timer of a 2 minute duration (or other value deemed typical of a standard commercial break) can optionally be implemented to ensure that this "commercial active" signal does not extend beyond that period, even if the program material itself contains black frames.

The Hanpachern invention then proposes use of this commercial active signal to automatically pause a VCR during taping of a show or sporting event, thereby eliminating commercials from the final recording of the feature. The television system is not, however, effected—one must still endure the commercials if the broadcast is being viewed contemporaneously with the recording.

The present invention proposes, e.g. use of such a signal generated as described above, or in any other suitable manner, to facilitate "channel surfing" during commercials by providing an automatic return to the original, i.e. primary, program at the end of the commercial break.

In one embodiment, the remote control is equipped with a button labeled, e.g., "Surf." FIG. 1 is a logic flowchart for carrying out one embodiment of the TV-based invention. The use of the term "step" herein is not intended to imply a required order to carry out the steps. The designated numbers are for convenience. At the commencement of a commercial break, the viewer simply presses this surf button before starting to channel-surf. Upon receipt of this surf command 30 (step 2), the TV set: stores its current channel number (step 4); initiates a background process to monitor that primary channel for black frames in the manner described above (step 6); and starts 32-second-and-two-minute timers (step 8), again as described above. It should be noted that the background process, generally, requires an independent tuner in order to monitor the current channel while the viewer surfs alternative channels. Due to this two-tuner reason, this embodiment is especially suited to TV models that incorporate picture-in-picture capability. The existing secondary PIP tuner can be used for these surfing or monitoring purposes.

With the surf feature thus activated, the viewer is now free to issue other remote control commands as needed. However, as soon as either of the two timers expires (steps 10 or 12), the TV set will automatically tune itself back to the saved channel number (step 14), returning the viewer to the program of primary interest at the appropriate time. Additionally, the viewer can cancel the so-called surf timers and immediately return to the primary channel at any time by pressing the surf key a second time (step 16).

Figure 3:
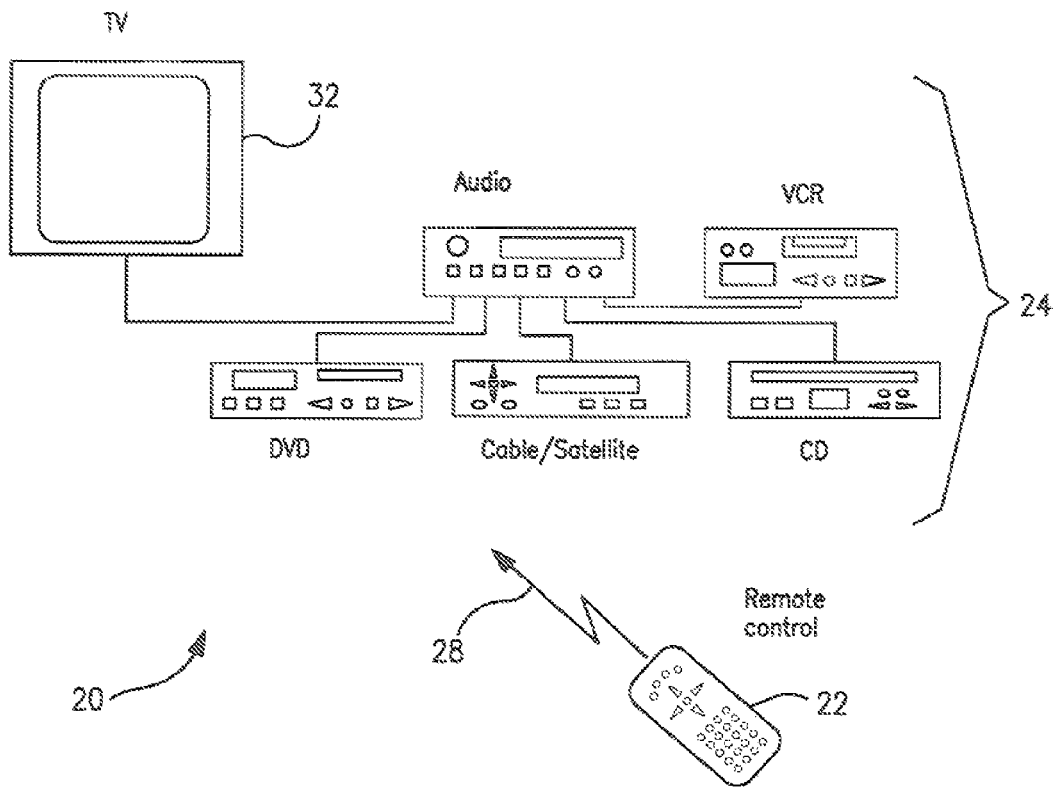
FIG. 3 depicts a media system comprising a television without 2 way remote wireless communication.
Figure 4:
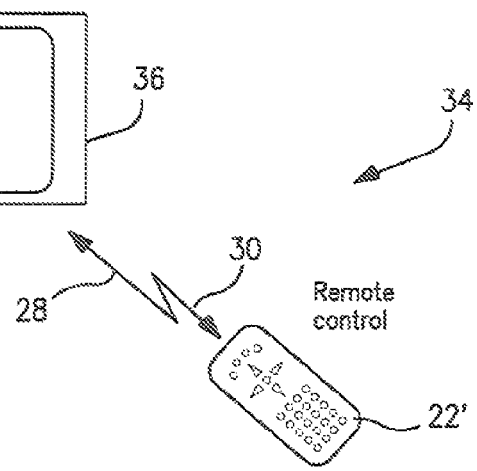
FIG. 4 depicts a media system with a television and a remote control adapted for bi-directional communication with each other.

FIG. 3 shows a media system 20 comprising a remote control 22 in communication with a plurality of electronic devices 24. Preferably the communication link between the remote control 22 and the electronic devices 24 is wireless and may include a unidirectional IR or RF link 28. The TV 32 in FIG. 3 does not include two-way IR 20 capability. By contrast the media system 34 shown in FIG. 4, the TV 36 comprises two-way IR or RF capability 30 for bi-directional communication with the remote control 22'. For convenience the invention will be described by reference to TV 32, though it will be understood that a two-way interface may be used in certain 25 applications.

Figure 5:
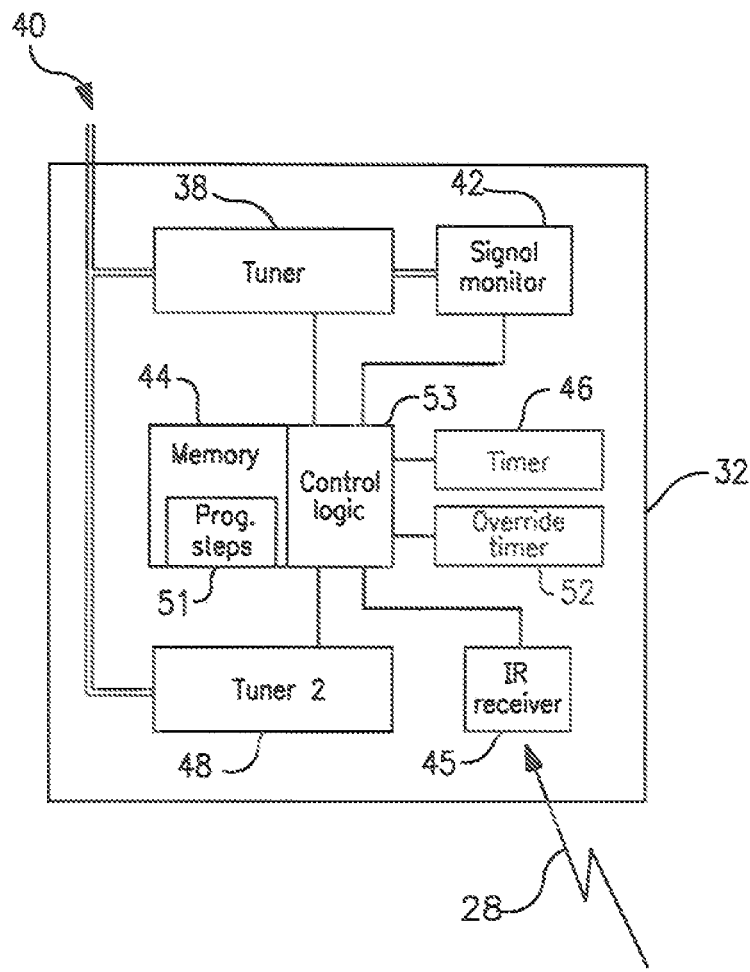
FIG. 5 shows a block diagram of a television according to an embodiment of the invention.
Figure 6:
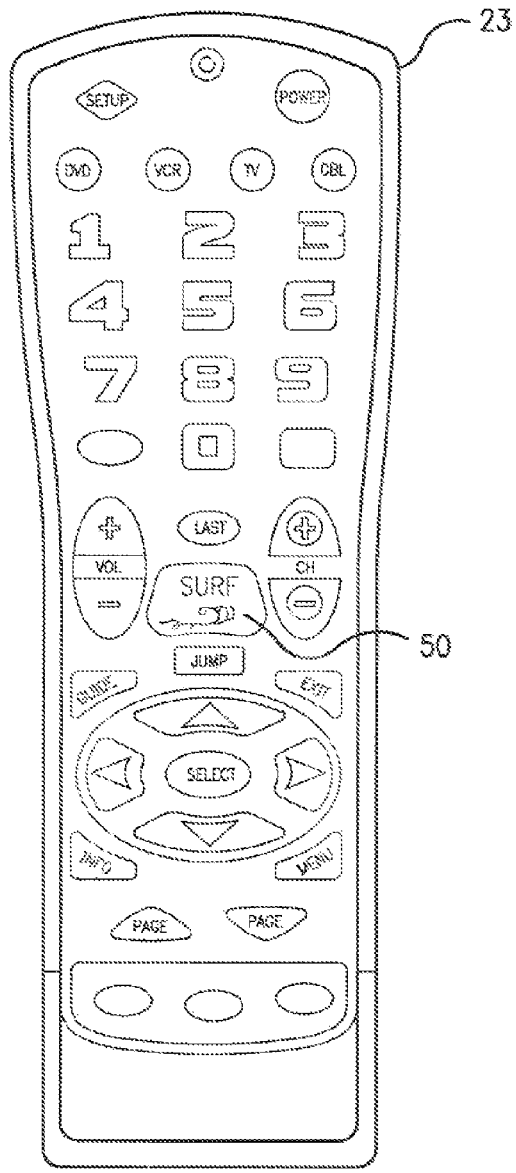
FIG. 6 shows a remote control according to an embodiment of the invention.
Figure 7:
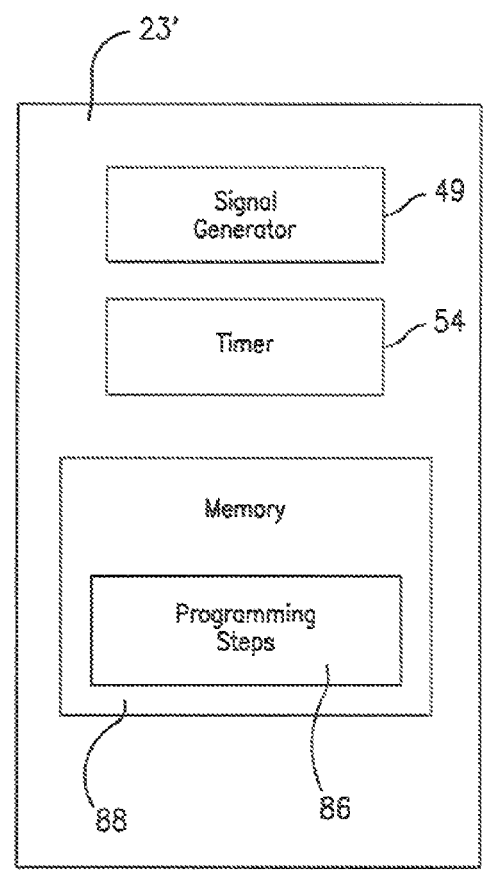
FIG. 7 shows a block diagram of a remote control according to an embodiment of the invention.

FIG. 5 shows a block diagram of a TV 32 according to an embodiment of the present invention. The TV 32 includes a first tuner 38 connected to receive a media transmission 40 and to select a channel. A signal monitor 42 is connected to the first tuner 38 to monitor the media transmission 40, and memory 44 is used for storing channel data. A primary timer 46, associated with the control logic 53, is reset, or begins timing, or restarts timing a predetermined interval upon receipt of (i.e. in response to) a predetermined signal indicator from the signal monitor 42. In one preferred embodiment, the predetermined interval is 32 seconds and the predetermined signal indicator is a, or corresponds to a, so-called "black frame." As discussed above, the TV 32 preferably includes a second tuner 48 for channel selecting, connected to the picture decoding and display circuitry of the TV set (not shown). This allows the first tuner 38 to continue to monitor a specific channel of the media transmission 40 while the second tuner 48 is used to surf various other channels. Upon (i.e., in response to) expiration of the predetermined interval, the tuner 48 is directed by the control logic 53 to select (e.g., tune to) a channel corresponding to the channel data stored in memory 44. FIG. 6 depicts a remote control 23 such as may be used with the media system 24. The remote control 23 comprises a signal generator 49 (see FIG. 7), adapted to transmit a control signal, e.g. signal 28, compatible with the television 32. In response to a predetermined user action, such as operation of a surf key 50, the signal generator 49 transmits a signal to the television 32. Receipt of this signal via the TV's IR receiver 45 (see FIG. 5) causes the control logic 53 to initiate monitoring of the media transmission 40 by the signal monitor 42. The media transmission 40 is also referred to herein as a media signal 40 or program signal 40.

Preferably programming 51 is stored in memory 44 to control monitoring of the media signal 40 for the occurrence of a predetermined event. Monitoring may be initiated in response to a user-initiated signal (such as IR transmission 28 generated by depressing surf key 50). Contemporaneously, or subsequently, the current channel may be stored in memory 44. Again, upon expiration of the predetermined interval, the system will return to the stored current channel. It should be noted that the predetermined interval 30 may be an override interval timed by an override timer 52 (see FIG. 5). However, preferably, the system reconfigures upon expiration of the first of the predetermined interval, as timed by timer 46, or the override interval, as timed by override timer 52.

Remote Control-Based Implementation

In an alternate implementation contained entirely, or substantially, within the remote control 23, or preferably 23', the received program signals 40 are not available to be monitored, so a simple timer 54 set for the typical duration of a commercial break is used instead. In a media system such as 34 in which the television set 36 is capable of two-way communication with the remote control 22, it may be possible for the remote control to automatically determine the active channel number at the moment the surf button 50 is activated. However, in general the remote 23 is not able to automatically determine the active channel number at the moment the surf button 50 is activated. In a media system such as 24, a means must thus be provided for the user to indicate his desired primary viewing channel ahead of time. Such indication may, however, be performed only once at the outset of each show or sporting event watched, rather than prior to each commercial break. In an alternative embodiment, the remote control may determine the current channel by monitoring direct channel inputs and Up/Down channel changes. This embodiment is discussed in more detail later.

Figure 2:
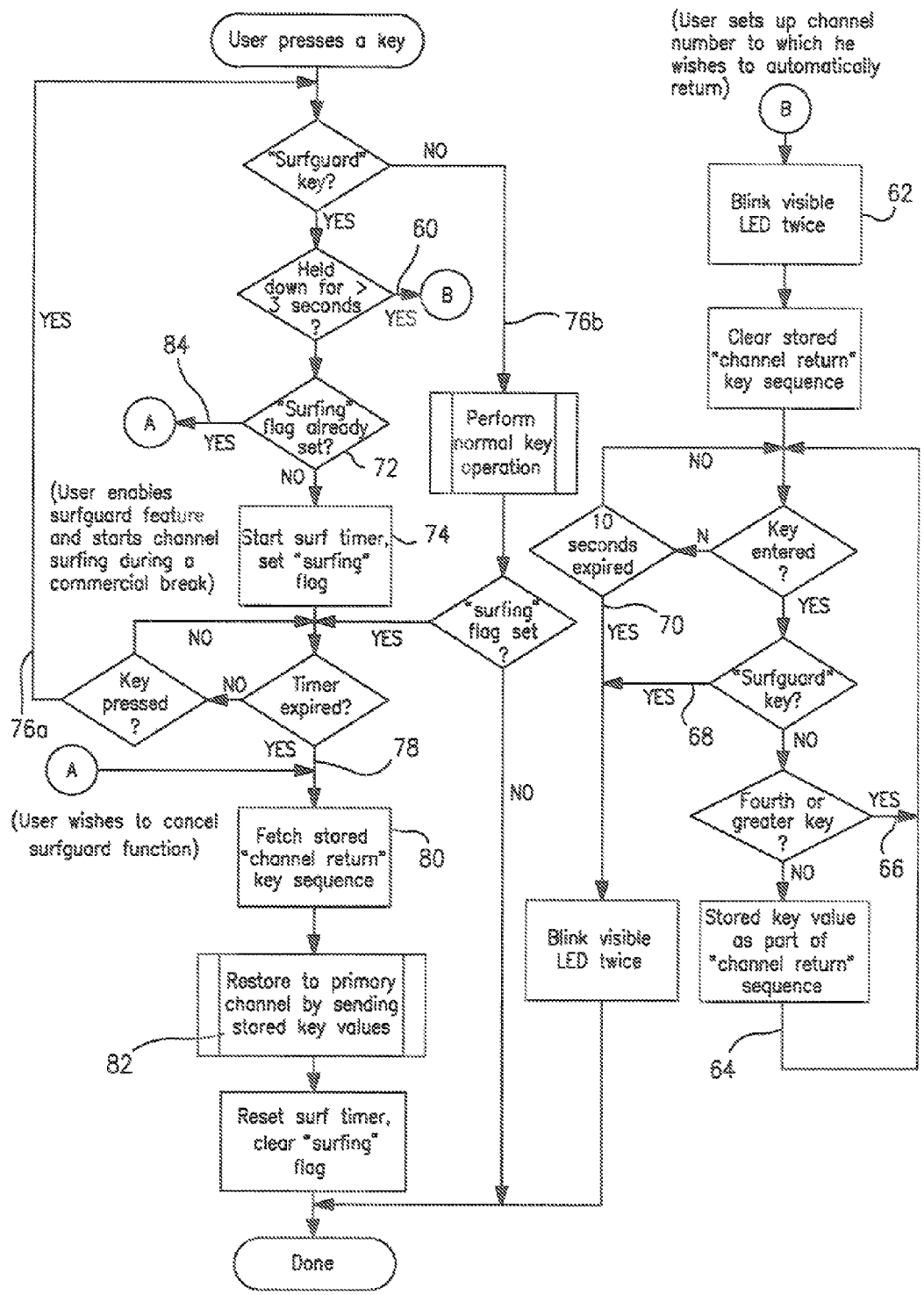
FIG. 2 is a flowchart depicting one method for implementing a remote control-based embodiment of the invention.

Referring to FIG. 2, when the user initially begins viewing a program or event, he indicates to the remote 23' which channel is of primary interest as follows:

Press and hold the surf button 50 for approximately three seconds (step 60) until the visible LED blinks twice (step 62), signaling that the remote 23' is ready to accept channel information.

Enter whatever sequence of keystrokes is necessary to tune the TV set to the channel in question. Depending on the particular model of TV, this will usually consist of one or more digits, possibly in conjunction with an "enter" or similar key (step 64). The remote may, however, be programmed to accept and store any sequence of up to three keystrokes (step 66). Also, the three keystroke limit imposed at step 66 is implementation specific and in practice any reasonable limit up to the maximum keystroke storage capacity available in the unit may be used. To signal the end of key entry, the user presses the surf key 50 once again (step 68). This causes the remote to exit this channel entry state and return to normal operation, with the keystroke sequence stored for future use. (In addition, if at any time during the entry process no key is pressed for, e.g., 10 seconds, the remote will automatically exit this channel entry state (step 70).)

Whenever a commercial begins and the user wishes to "channel surf" he first briefly presses the surf button 50 (step 72). This starts a timer 54 running within the remote control 23' (step 74). The timer 54 is nominally set for a two-minute interval (but configurable by the user for shorter or longer times if desired). During the timing period (i.e. the commercial break), the remote 23' operates in the usual manner (steps 76a-76b) to allow the user to switch channels and view other material. When the timer expires (step 78), the remote 23' retrieves the previously stored keystroke sequence, the channel data (step 80), and plays it back, thereby automatically returning the TV to the desired primary channel (step 82).

While the user is actively surfing (i.e. the timer in remote control 23' is running), he can, at any time, cancel the timer 54 and return immediately to the original channel by pressing the surf button 50 a second time (step 84).

In one embodiment the remote control 23' comprises programming steps stored in memory 88 of the remote 23'. The programming may, for example, comprise storing a primary channel indicator in memory 88 in response to a user predetermined action, and starting the timer 54 in response to a second predetermined user action. Note, however, the second predetermined action may be identical with the first predetermined user action and may be, for example, depressing the surf key 50.

The memory 88 also includes programming steps for transmitting a signal 28 to a media device 24, such as television 32, wherein the signal 28 corresponds to a primary channel indicator. The transmission may preferably occur upon expiration of a predetermined interval, upon expiration of an override interval, or upon cancellation of the surf mode, for example.

The predetermined user action for storing the primary channel in memory 88 may comprise performing the secondary predetermined action. In response to the user action, the programming may also determine if the media system is tuned to the primary channel, and if the system is not tuned to the primary channel, tuning it to the primary channel. The channel store operation may occur contemporaneous with, or subsequent to a user action, where such action may for example comprise depressing the surf key 50.

From the foregoing, it should be apparent that the present invention teaches a method of effecting, or bringing about, a return to a primary channel in a media device 24, such as a television 36. In one embodiment, the method comprises, in response to a user input, storing a primary channel in device readable memory (such as memory 88 or 44, for instance). The primary channel is monitored for a predetermined event indicative of a change in programming sources. The aforementioned black frame is one example of such an indicative event. A timer 54 of a predetermined interval is initiated, either based upon the user input or upon the predetermined event. The timer 54 is preferably reset upon occurrence of the predetermined event. Finally, the system is returned to the stored primary channel upon expiration of the predetermined interval.

An override timer, for timing an override timed interval, may also be initiated based upon the predetermined event. If the predetermined interval has not expired, the system may be returned to the stored current channel upon expiration of the override time interval. Preferably, the timing of the predetermined interval is terminated upon expiration of the override timer and the return to the stored current channel.

In another embodiment, a signal corresponding the primary channel stored in memory 88 is transmitted to a media device 24 adapted to receive the primary channel. For example, the remote control 22 may transmit a signal 28 to the television 36 to return to channel 2. The television 36 then receives the transmission 28 and changes to channel 2.

Embodiments of the invention may comprise monitoring a media channel for a predetermined event, and notifying the user upon expiration of (i.e. in response to) a predetermined interval. Such notification may include exposing the user to either the audio component of the primary channel, the video component of the 15 primary channel, or both.

A more general objective of the present invention is to provide a device readable medium adapted for use in a media system to facilitate providing a notification feature. The medium, in a preferred embodiment, comprises programming steps for storing, in response to the user input, a primary media channel of the media system in device readable memory. More generally, the state of the media system is stored in device readable memory. The media system state typically comprises the status of a plurality of features, parameters and the like. Such parameters include, inter alia, channel status, volume status, and picture control status; and may apply to one or more of the devices comprising the overall media system. For example, in system 24 the volume function may be performed by the audio amplifier' and the channel selection may be performed by a combination of the TV set and the Cable Box. In such a case a return to channel function may involve switching of TV inputs as a well as changing channel numbers on one or both of the TV and Cable box. The state of the media system is frequently and easily altered, typically by a user, from a first state to a second state. Generally, the system is altered most often as a result of channel surfing, or other parameter changes such as the muting of the audible portion of a program.

Prior to altering the media system, the user would, generally, actuate the surf key 50 to store the first state of the media system, which includes storing the primary channel and any other desired parameters. Such actuation also sets a timer for a predetermined interval. Upon expiration of the predetermined interval, the user may be notified via visible or audible indicators. Such notification may comprise disengaging the mute button, returning the system back to its first state, or displaying the first channel visual component within a visual display of the second channel, such as picture-in-picture, or any sufficiently notable change such that the user is notified. Preferably the primary media channel is monitored while the secondary media channels are altered. For example, channel 2, as the primary channel, would be monitored while the user surfs through the other available channels, i.e., the secondary media channels.

In systems where the signal for the current channel is not available, the remote control 23 may be programmed with the available channels through known means. As it is desirable to know the current channel for some applications of this event, it is useful to monitor an identifier of the media channel. This may be done, for example, by updating to a current channel register the identifier of the current channel, preferably using a channel entry method such as described in U.S. Pat. No. 6,029,239 or alternatively by monitoring number button presses and the intervals between them in order to derive channel information. In such an example, direct entry of the channel digits could be transferred to the register, and channel up/down controls would likewise effect the identifier stored in the current channel register. Preferably, however, the television 36 could transmit the current channel to the remote.

To reduce processing, the current register may preferably be updated after a delay of several seconds or longer. Thus, for example, changing through the channel would not update the current register because the user is just traversing the available channels to arrive at the soon-to-be-current channel. After the user has paused at the now current channel, the current channel register may update with the current channel information read from the available channel cue in the current pointer location. Then, if the user wants to surf, or alter the system but return to the primary, stored channel, the user presses the surf button 50. Depressing the surf button 50 records the media system's current state and starts available timers. If monitoring is available, that may be initiated as well. Upon occurrence of a predetermined event, the system may return to the first state, or merely notify the user. In an alternative embodiment, the remote 23' plays, in reverse order, all of the commands entered between selecting the surf key 50 and either selecting the surf key 50 again, or the expiration of one of the timers. If desired, non-channel control and non-audio commands can be filtered out such that only the channel and audio status are reset.

While the invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification.

As to U.S. patent application Ser. No. 09/611,620, filed Jul. 6, 2000, this application discloses an exemplary consumer electronic system 210. The system 210 includes a consumer electronic device 212, which is a DVD player 213 in a preferred embodiment. Other devices operable with removable digital media are envisioned as being within the scope of the invention. Accordingly, the system preferably includes at least one removable digital medium. In the system 210 shown in FIG. 8 the consumer electronic device 212 is adapted to operate with a digital video disc 214 or a digital memory card 216.

The digital memory card may be a secure memory card such as may be obtained from Matsushita Electronic Industrial, also known as Panasonic, SanDisc, or Toshiba Corporation or other types known in the art. In one embodiment the secure digital memory card (SD memory card) is approximately 24 mm by 32 mm by 2.1 mm 9 pins. It has a capacity from 32 MB (megabytes) to 250 MB. Generally SD memory cards or memory sticks may be rated at different respective sizes, e.g., from 2 MB to 10 MB. Preferably, the SD card is SDMI (Secure Digital Music) compliant.

Figure 8:
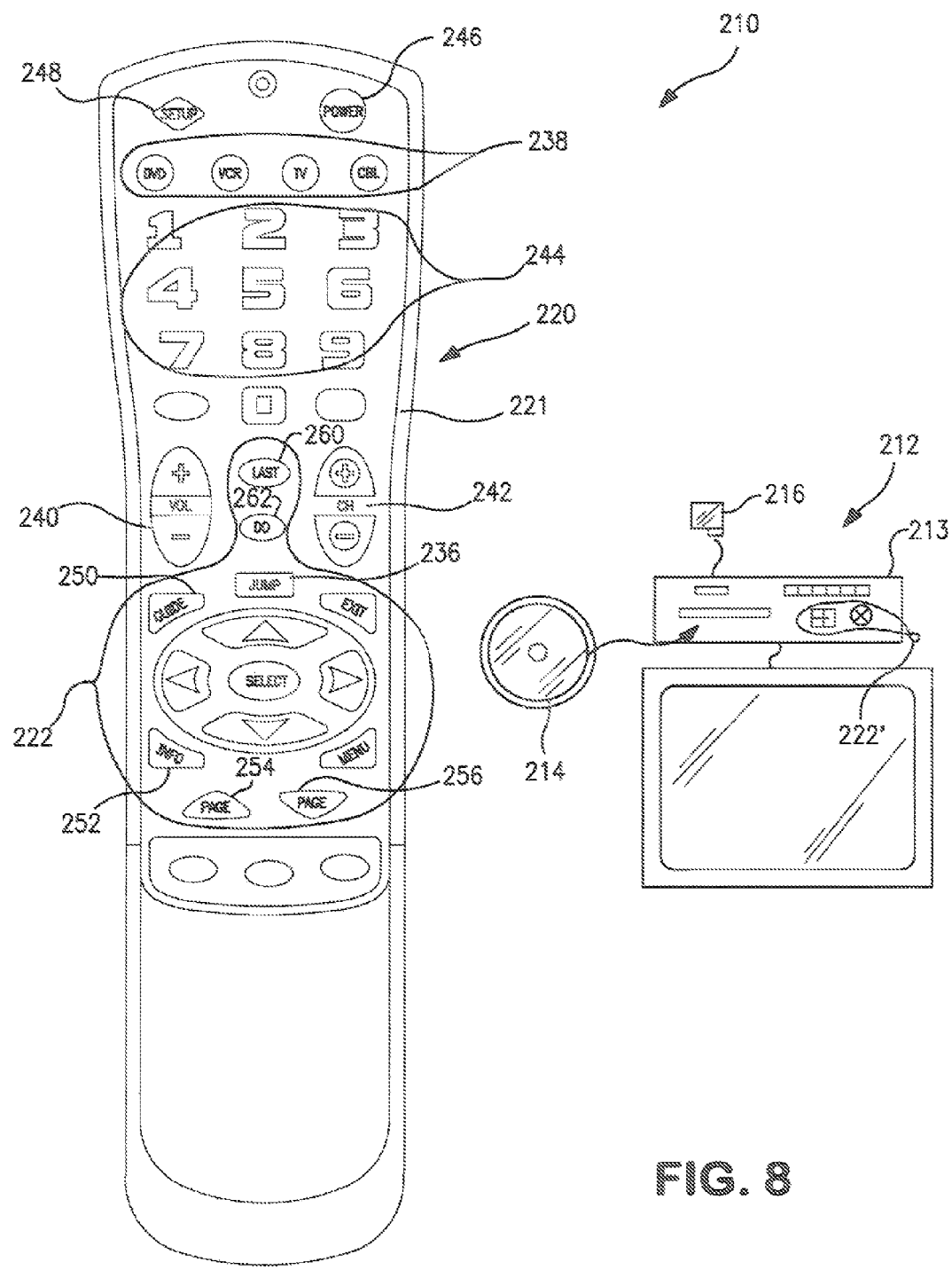
FIG. 8 depicts a consumer electronic system including a control module having navigation keys.

The system 210 also includes a control module 220 which in the preferred embodiment is a hand-held remote control 221. The remote control 221 includes navigation keys 222. In an alternative embodiment the navigation keys 222 may be integral navigation keys 222'. In FIG. 8 the integral navigation keys 222' are integral with the player 213.

Figure 9:
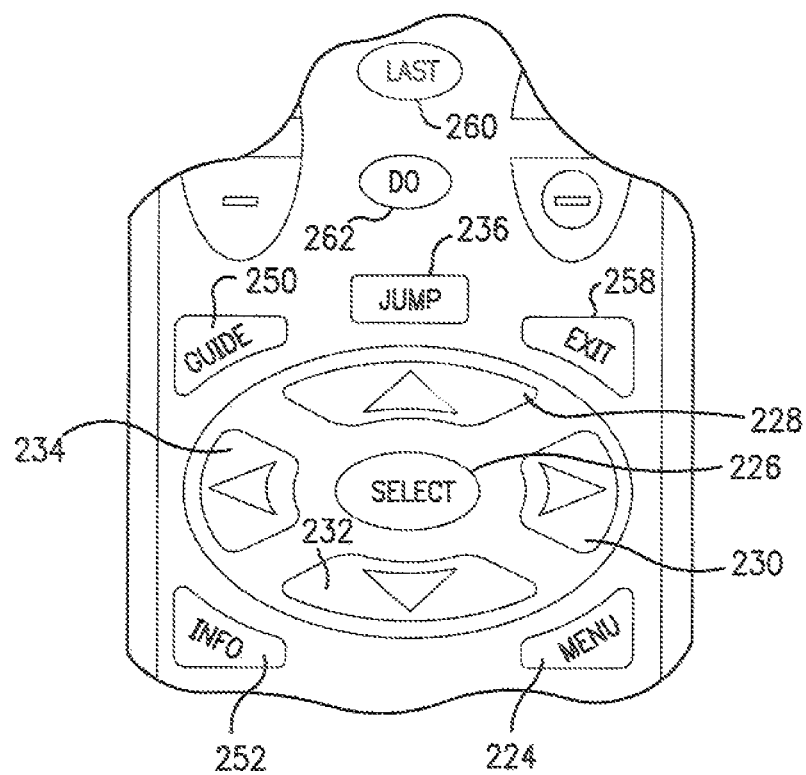
FIG. 9 depicts an enlargement of the navigation keys shown on the remote control of FIG. 8.

FIG. 9 shows an enlarged view of some of the navigation keys of remote control 221, including MENU key 224, SELECT key 226, and the four directional keys 228, 230, 232, and 234. FIG. 9 also shows the JUMP key 236.

The remote control 221, preferably includes mode keys 238 for allowing the remote control to change, in the embodiment shown in FIG. 8, between DVD, VCR, TV and cable modes. Remote control 221 generally includes standard keys such as volume key 240 and channel key 242. Digit keys 244 provide for direct entry and numeric response to queries which so require. The remote control 221 is also generally provided with a power key 246 and set up means, such as programming initiated with set up key 248.

It is desirable to provide the remote control 221 with additional navigation keys such as a GUIDE key 250, an INFO key 252, PAGE UP and PAGE DOWN keys 254, 256, and an EXIT key 258. Preferably the remote control 221 is provided with, so called "quick macro" keys "LAST" 260 and "DO" 262 which will be described in further detail below.

Figure 10:
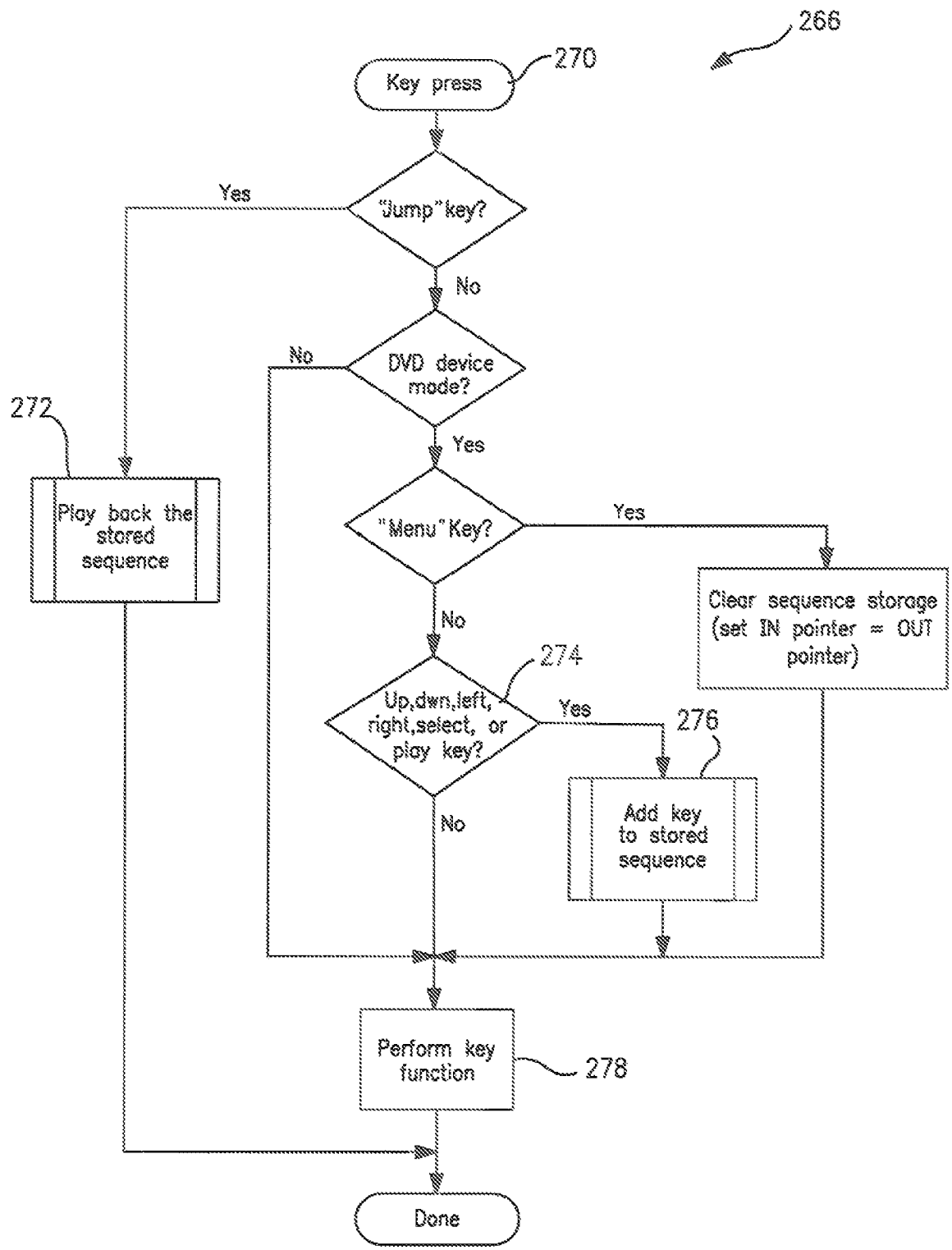
FIG. 10 shows a flowchart representing one method of storing and playing back a sequence of navigation keys.

FIG. 10 shows a flowchart 266 representing the basic logic, of one preferred embodiment, that may be carried out every time a key press of the remote control 221 is detected (step 70). Flowchart 268 of FIG. 11, which is discussed in more detail below, represents one method of storing a key's value.

In one embodiment, the remote control 221 checks to see if the key pressed is the JUMP key 236, i.e., remote control 221 monitors key activation. If the JUMP key is activated, the remote control 221 initiates (at step 72) playback of the currently stored sequence of the Menu navigation key presses. This will be described in more detail in conjunction with FIG. 13.

If the key activated is not the JUMP key, the remote control 221 then determines if its current mode setting is "DVD," for example. If not DVD mode, the user interface, e.g., the remote control 221, bypasses any further checking and performs the key function in the usual manner. This process ensures that only menu and navigation key presses applicable to control of the desired digital player device (i.e., the DVD player) are captured. (If the remote in question were a "single mode" or "modeless" unit, i.e. capable of controlling only the DVD player, for example, this step may easily be omitted.)

If the remote control 221 is in DVD mode, the remote 221 then checks to see if the activated key is the menu function (or MENU key) 224. If the MENU key 224 is pressed, one may assume this action to be the start of a new series (new sequence) of menu navigation keystrokes by the user. The sequence storage (e.g., sequence table 281) is then set to "empty" by setting the "IN" pointer 290 equal to the "OUT" pointer 292. Other methods of clearing the key sequence memory will be apparent. (The functioning and description of the IN and OUT pointers will be described in more detail in conjunction with FIGS. 11 and 12 below.) Note that in the process set forth in FIG. 10, the MENU key 224 is not stored in the sequence table 281. This is advantageous if MENU key 224 is always the start of a new navigation sequence. Thus, one need not use memory space to store the MENU key 224. In other implementations, there may be more than one key which initiates entry into a menu system (e.g., "GUIDE," "INFO" etc., used alone or in conjunction with a "MENU" button, and so forth) in which case the initiating key function should be stored as well for playback.

The remote 221 determines whether the key pressed is one of the set of functions associated with the menu navigation (up, down, left, right, select and play in this example) at step 274. If the key pressed is a navigation key, the remote 221 stores the key value into the sequence table 281 at step 276, if a navigation key was not pressed, the storage step is bypassed. This filtering means may occur when the values are being loaded into memory, or upon execution of the stored sequence. The storage process is discussed more fully below with reference to FIGS. 11 and 12.

In a preferred embodiment, the remote 221, at step 278, completes the processing and sends the transmitted, preferably IR, function corresponding to that pressed key. RF technology and or communication techniques are also compatible with the inventor.

Figure 11:
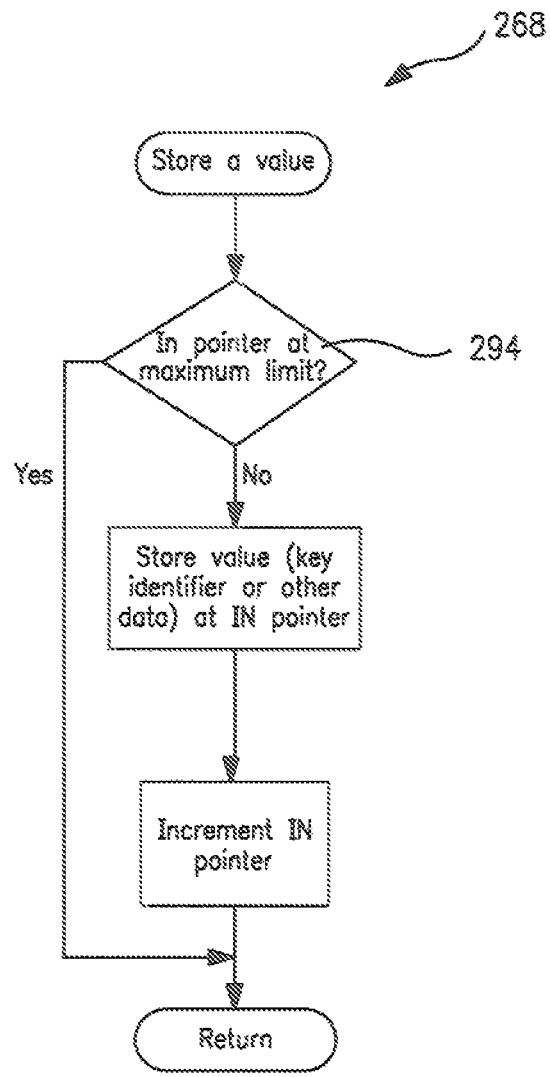
FIG. 11 shows a flow chart representing a method of adding a key to a stored sequence.
Figure 12A:
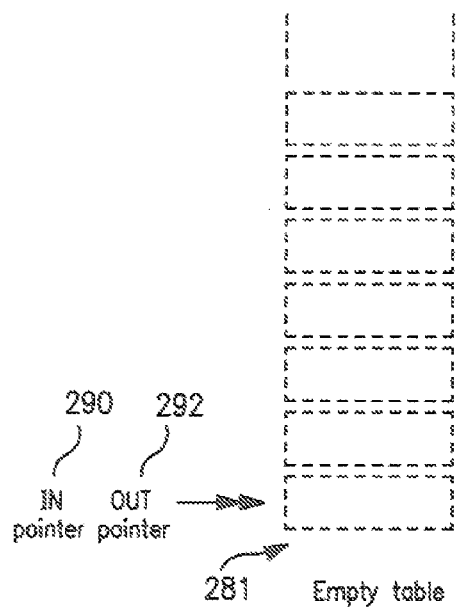
FIGS. 12(a)-12(d) show changes to a key sequence table as keys in a sequence are stored in the table.
Figure 12B:
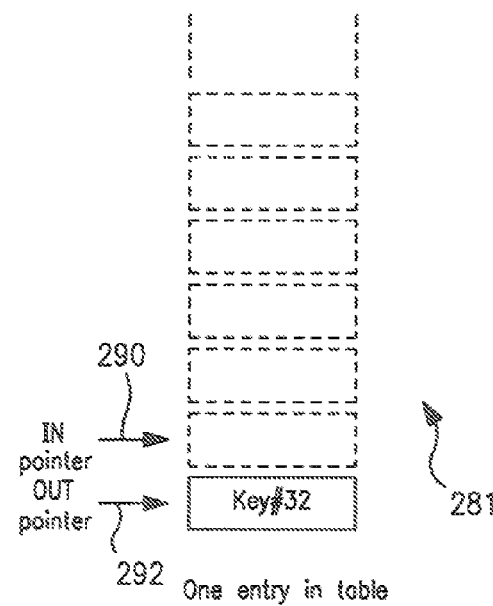
Figure 12C:
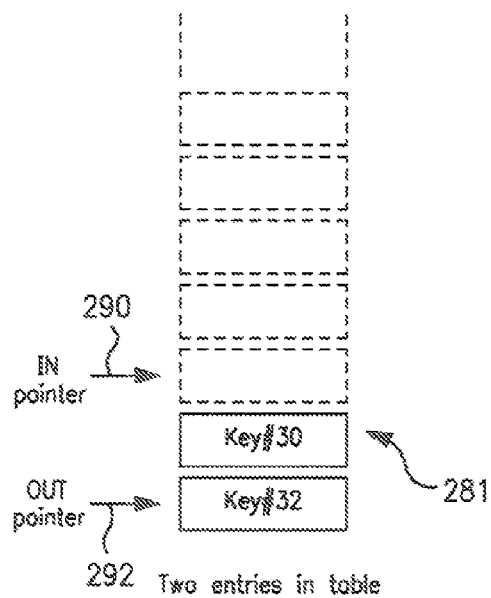
Figure 12D:
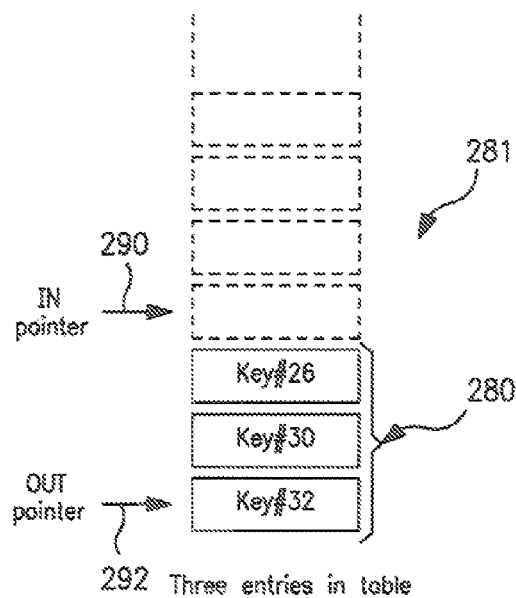

FIGS. 11 and 12 depict the process for saving a sequence of menu navigation keystrokes 280 (see FIG. 12*d*). FIG. 11 shows a flowchart 268 representing how data is entered into the sequence table 281 using the IN pointer. First the IN pointer 290 (see FIG. 12) at step 294 is checked against a maximum predetermined value. This is one method of preventing overflow of table data into areas of memory allocated to other remote control functions. Other methods safeguarding memory will be apparent to those of skill in the art. Without this safeguard, such an overflow could, for example, be created by a user idly jiggling one of the navigation keys while not actually using the DVD device. The maximum IN limit can be set to any value compatible with the aforementioned goal of memory protection. However, for practical purposes, a number on the order of 32 is expected to be more than adequate.

If the maximum IN value has not been reached, the remote 221 simply stores the current key value at the location indicated by the IN pointer 290 increments the IN pointer 290 to point to the next available location (see FIGS. 12(*a*)-12(*d*)) and returns to the main routine.

Referring to FIG. 12, one method of storing the navigation sequence is by controlling two pointers to a table space in memory, e.g., the sequence table 281. The pointers are labeled IN 290 and OUT 292. The IN pointer 290 indicates where the next keystroke to be stored will be placed, while the OUT pointer 292 indicates where playback of a key sequence will begin. During entry of data into the table 281, the OUT pointer 292 never changes. (Conversely, during retrieval of data from the table 281, the IN pointer 290 never changes.) Other methods of storage will be apparent to those of skill in the art from the teachings disclosed herein. FIGS. 12(*a*)-12(*d*) show the progression of table data contents and pointers as a sequence of keystrokes "DOWN ARROW," "RIGHT ARROW," and "SELECT" are stored.

Figure 13:
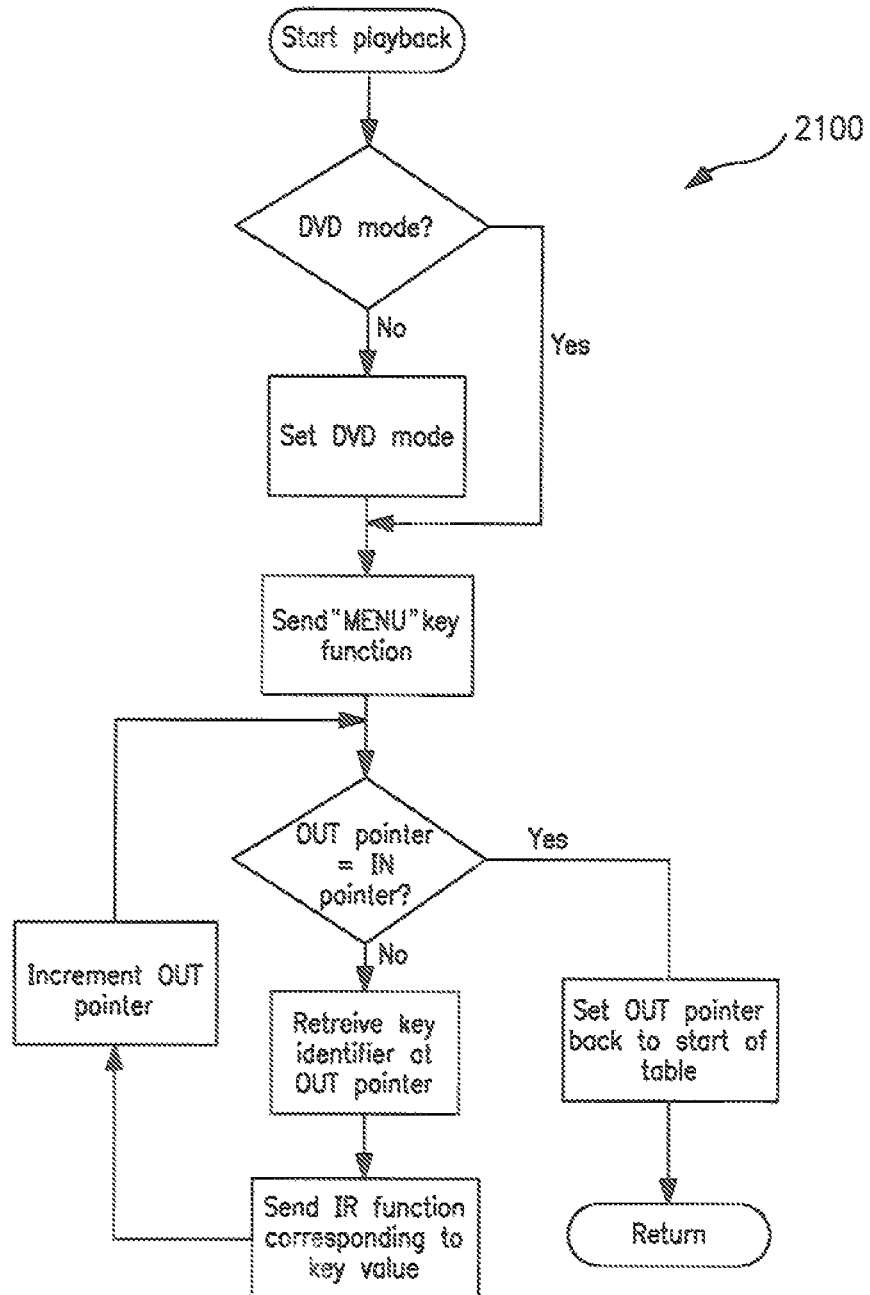
FIG. 13 shows a flowchart representing a process for playing back a stored sequence.

FIG. 13 shows a playback logic flowchart 2100 representing a method to effect playback of the stored keystrokes 282 once the JUMP key 236 is activated. (More generally, a sequence may be stored between a first predetermined key and a second predetermined key, and playback initiated by a third predetermined key.) First the remote control 221 checks to see if it is currently in the applicable mode, e.g., DVD mode. If not, it switches to that mode (i.e., the JUMP key 236 effects control of the DVD device regardless of the current mode of the remote control 221.) In the playback implementation shown in flowchart 2100, the remote control 221 automatically sends the implied "MENU" command (because the MENU command was not stored to save memory).

The logic then checks to see if the OUT pointer 292 equals the IN pointer 290. When the keystroke storage table (the sequence table) 281 is empty, the OUT pointer 292 equals the IN pointer 290. A sequence table 281 that is empty is shown in FIG. 12(*a*). If the OUT pointer 292 equals the IN pointer 290, the remote control 221 then preferable exits the DVD menu mode. Though the menu mode has been exited, the secondary material is still accessible. This is particularly so when, for example, the menu system was navigated to add an alternative viewing angle, or show special effects features, etc. along with play of the primary material.

In this embodiment pressing the JUMP key 236 when no key sequence has been stored is the equivalent of, or results in the same effect as, pressing the "MENU" key 224. That is the menu screen is displayed upon activation of JUMP key 236.

If the OUT pointer 292 does not match the IN pointer 290, the key data at the location corresponding to the OUT pointer 292 is retrieved, and then the corresponding IR command is transmitted. Programming then increments the OUT pointer value and repeats the OUT=IN? test. If OUT and IN are not equal, the control module continues to repeat the retrieve and transmit sequence until the OUT=IN? test is true. Alternative methods of changing and comparing pointer values is acceptable. More generally still, other methods of key storage and retrieval are acceptable and within the scope of the invention described herein.

When the two pointers are equal after the key sequence has been transmitted, the sequence playback is complete and the unit 221 resets the OUT pointer 292 back to its starting value (i.e., the unit 221 readies itself to play the same sequence back again if required) and then returns to the main routine. In this manner, one may navigate material, e.g., secondary material, to a desired screen. Intermediate screens may be displayed or the logic may allow the user to go directly to the desired screen.

Figure 14:
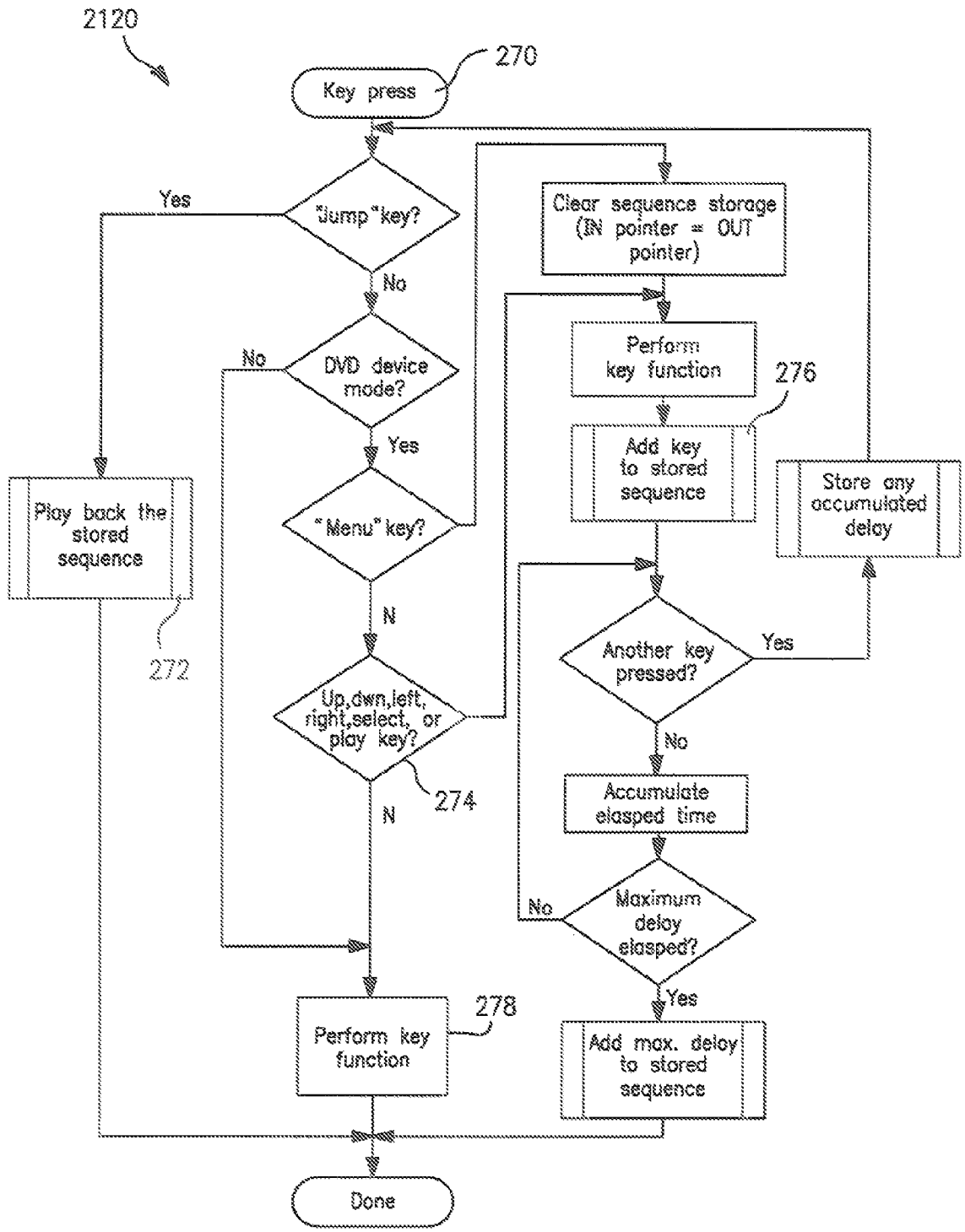
FIG. 14 shows a flowchart representing a process for storing and playing back a sequence that includes interkey time delays.
Figure 16:
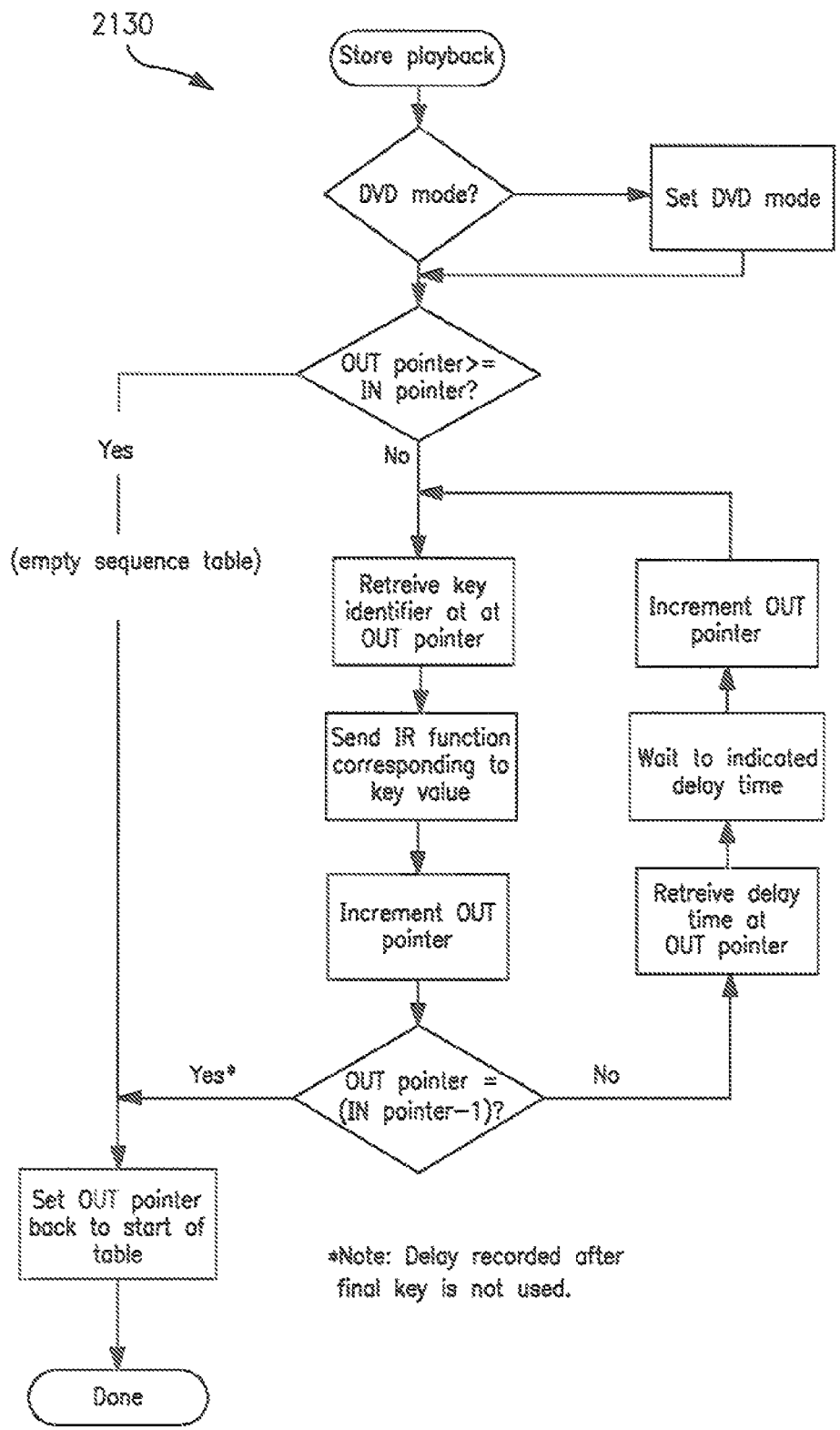
FIG. 16 shows a flowchart representing a process for playing back a stored sequence having interkey time delay values.

In some applications, it is anticipated that the time interval between key presses may be significant, i.e., relevant to the menu selection, etc. For example, where a key press causes a sub-menu display to be initiated, and the target device must wait to recognize a subsequent selection key press until the sub-menu display is ready. In these and other cases, it is advantageous to store not only key press values, but also the elapsed time between the key presses and then replicate these pauses during playback—i.e., a "real time" playback. FIGS. 14-16 show an alternative approach for storing and playing back key sequences. The methods discussed in reference to FIGS. 14-16 account for an interkey pause sequence 282 (see FIG. 15), or a sequence having an interkey pause time. For comparison and clarity, FIGS. 14-16 show how this feature can be implemented by modification of the routines shown in FIGS. 10-13.

FIG. 14 depicts a flowchart 2120 representing a process for interkey delay storage. The flowchart 2120 is modification of the routine shown in FIG. 10. Flowchart 2120 is modified to include capture and storage of the interkey pause time 284 (see FIGS. 15(*c*) and 15(*g*)). The initial selection process (e.g., determining whether a key press is a DVD menu navigation key) and storage of the key press value remains similar. However, after transmitting the key function, the remote 221 remains active to measure the elapsed time between this keystroke and the next. When the next key press in a sequence is detected, or if a predetermined maximum time has elapsed (e.g., 5 seconds), the remote 221 times the value and stores it as a second entry into the sequence table 281 (see FIG. 15(*g*)).

FIG. 15 shows this time delay storage process in more detail regarding the sequence storage table s81. The same sequence of keystrokes in FIG. 13 is used. Playback of such a sequence of interleaved key values and delay times is shown in flowchart 2130 of FIG. 16. Note that the delay time saved after the final key press need not be implemented.

The embodiments described above offers the user a convenient way to, among other features, repeat a sequence, preferably the last sequence, of keystrokes applicable to a particular sub-set of keys on a user interface. Features such as the "user macro" described in U.S. Pat. No. 5,959,751 allow the user to program often-used fixed sequences of keystrokes for controlling hardware, e.g., controlling the player vice accessing the storage medium, on a semi-permanent basis.

Another desirable feature would be a sequence definition process that falls somewhere between the "fully automatic,"

and filter capable, systems described in the above embodiments and the semi-permanent system described in U.S. Pat. '751. An objective is to allow the user to very quickly program and use a sequence of keystrokes of short-term usefulness, for example, for the duration of a show or sports event or portion of the video. This may be particularly useful in reviewing secondary material where one may want to see the same scenes multiple times from different angles, rather than watch the scenes simply play out. Further, this "DO" feature can be implemented as a sub set of the JUMP feature wherein the DO key sequence is not stored as part of the JUMP sequence.

Figure 17:
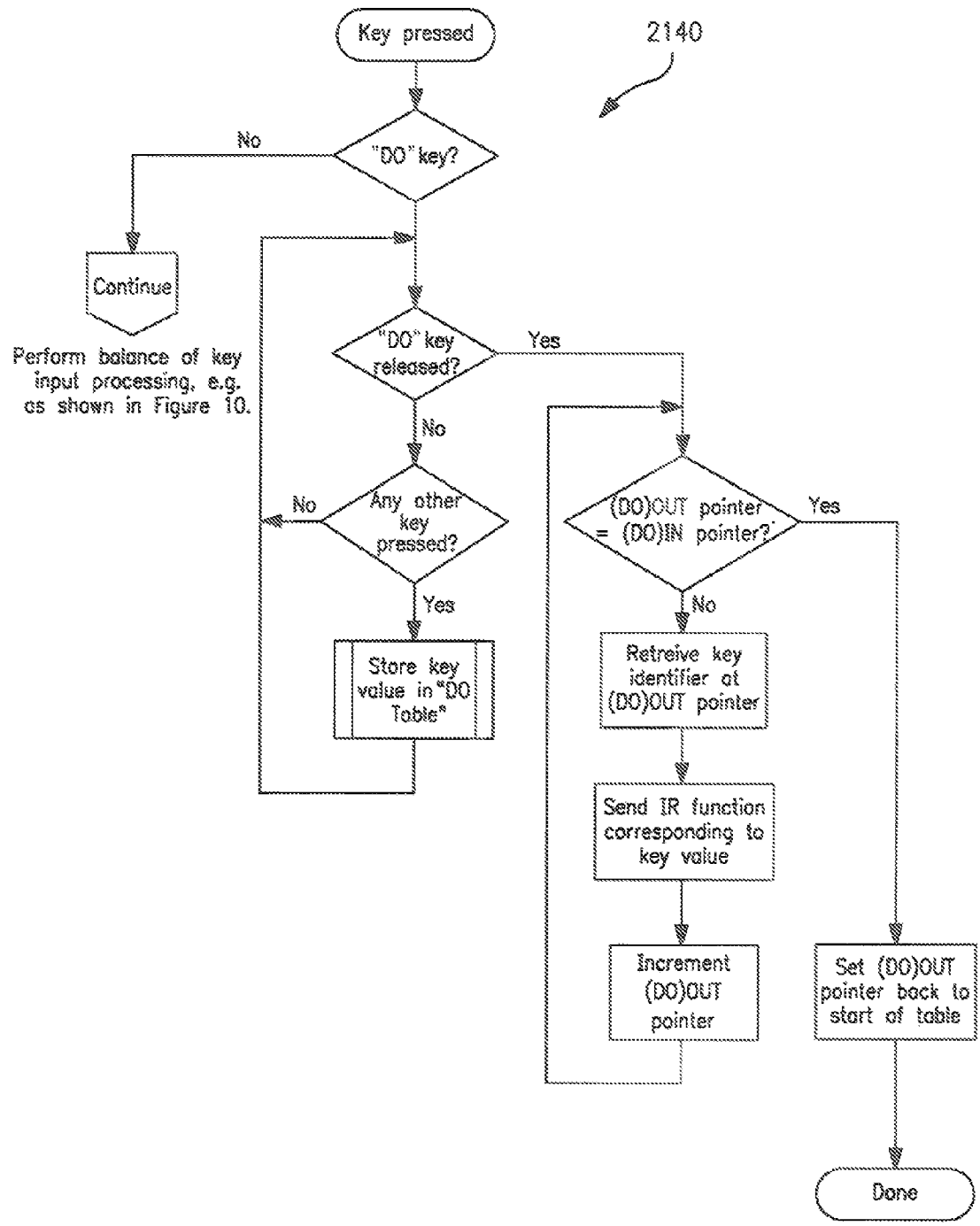
FIG. 17 shows a flowchart representing a process for implementing a so called quick macro.

One method of implementing a DO feature is represented by Flowchart 2140 of FIG. 17 with the DO key, number 262 shown in FIG. 8. In general, if the user presses and holds this special, or predetermined key (DO key 262), the remote 221 will memorize all other keystrokes entered while DO is held down. If, however, the user presses and releases DO with no intervening input of other keys, the remote 221 will play back the last-entered DO sequence. Other variations on this exemplary process will be apparent from the teachings disclosed herein.

FIG. 17 shows Flowchart 2140 setting forth an embodiment of the above-described process. When the DO key 262 is initially pressed, the remote 221 enters a state where it monitors the other keys on the unit, storing key values into a DO table for as long as the DO key remains depressed, i.e., adding keys to the DO sequence table. Storage of key values may be performed in exactly the same ways as previously described in conjunction with FIGS. 11 and 12, except, perhaps to a second storage location independent of any jump key sequence that may exist. This provides for both JUMP and DO features. (When the DO key 262 is released, the remote 221 will then play back the storage sequence of keystrokes.) In the implementation shown in FIG. 17, it may be noted that the key sequence entered is played back immediately after entry, by way of confirmation. It will be appreciated that minor changes in logic can be made to effect playback of the sequence only on subsequent presses of the DO key 262. Also, the capture of inter-key timings can be included if desired, in a manner similar to that described above in conjunction with FIGS. 14-16.

Figure 18:
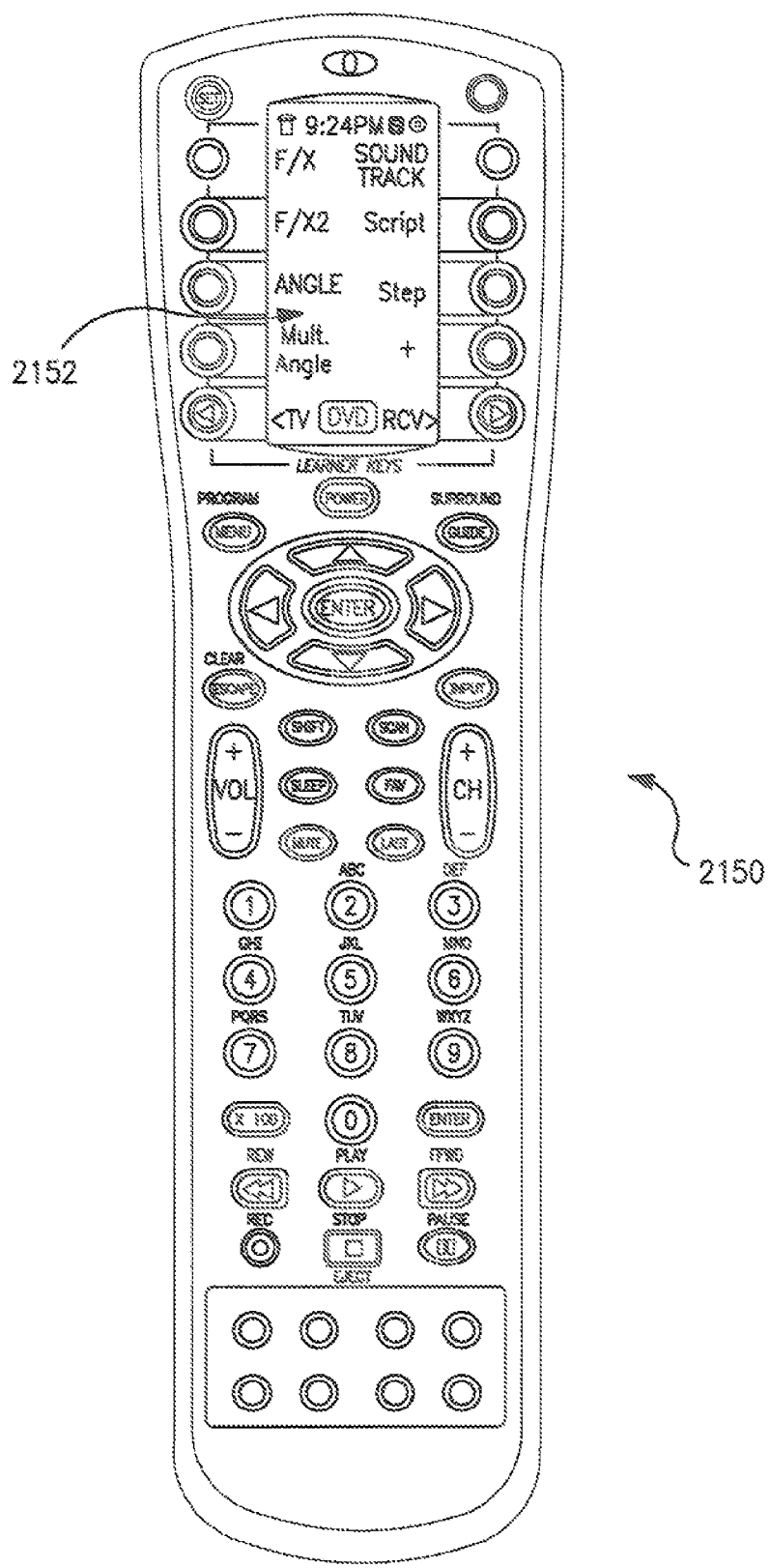
FIG. 18 shows a remote control capable of displaying at least one menu on a display screen.

In another embodiment, the user interface, e.g., a control module 220, reads at least one menu from the material provided on the removable digital medium 214 and stores the at least one menu in memory. In a preferred variation of this embodiment, the at least one menu is displayed on the control module 220. FIG. 18 shows a remote control 2150 capable of displaying the at least one menu on a display screen 2152. In a preferred embodiment, the display screen 2152 is an LCD screen. The display screen 2152, preferably via a touch screen, provides access to secondary material, such as special effects (F/X), different angle views (ANGLE), multiple angle views (Multi/Angle), and other such material as discussed previously.

In yet another embodiment, the remote control unit includes a larger LCD capable of displaying the menu graphic(s) and/or buttons as defined by the material provided on the removable digital medium and transmitted to the remote by the player hardware. If this LCD is also equipped with touch screen capability, the arrow keys may be dispensed with as the remote can automatically generate the appropriate sequence of navigation keystrokes followed by a "select" command in response to a single touch by the user on the desired choice. Alternatively, the remote can send just an "x-y" coordinate for the button touched and the player hardware can decode this to the appropriate function command.

FIG. 12 depicts how a typical DVD menu tree 2160 may be arranged in terms of the choices 2162-2174 offered the viewer. In a conventional system, these would be displayed on the TV screen and navigated using the directional keys on the remote control. However, an alternative approach on DVD players equipped to communicate with a two-way capable remote control including a touch screen LCD display might be to present the menu choices as a series of displays, e.g., 2164-2168, on the remote control itself. Selection is performed by the user touching the desired choice.

Figure 19:
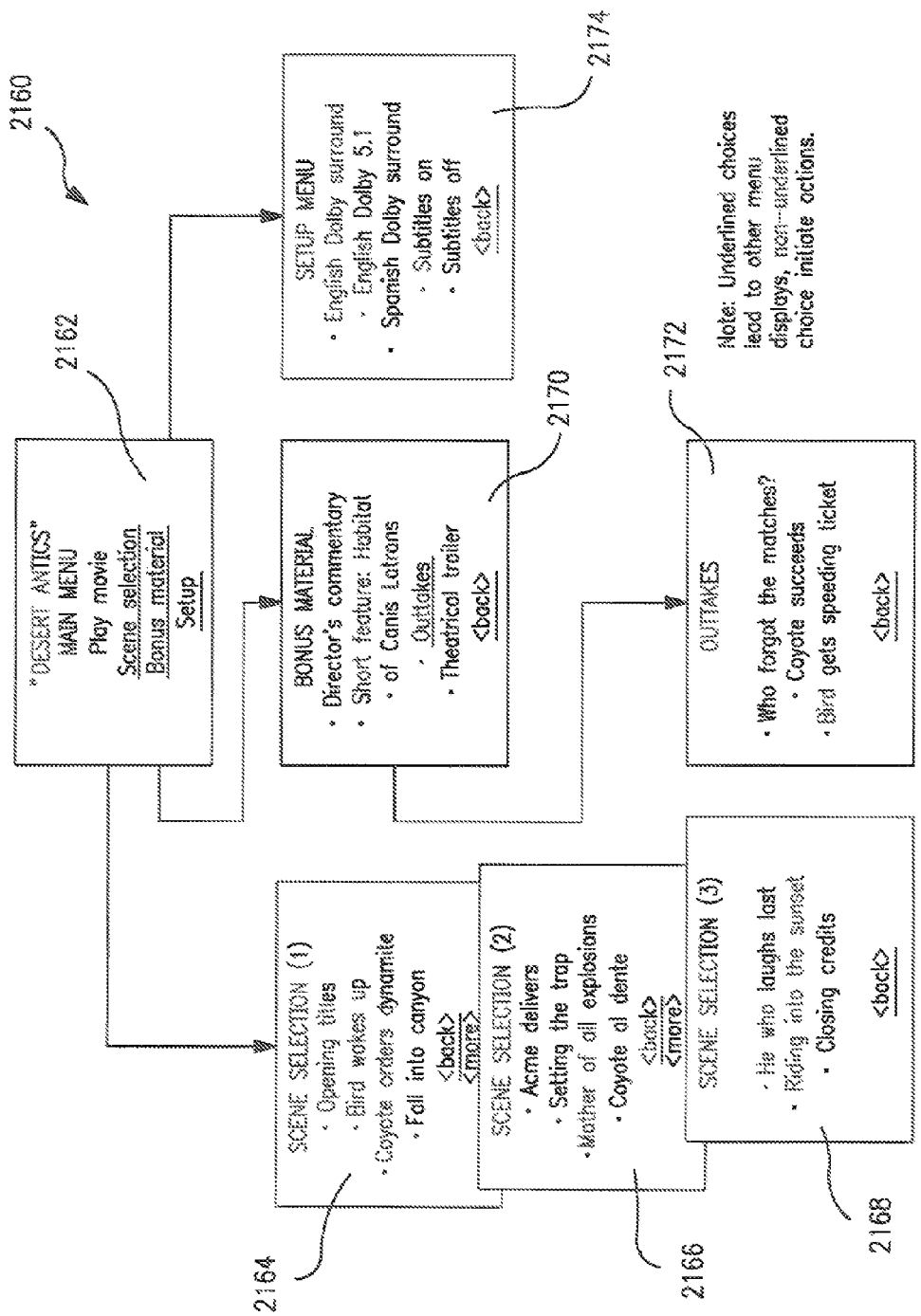
FIG. 19 shows an example of a DVD menu tree.
Figure 20:
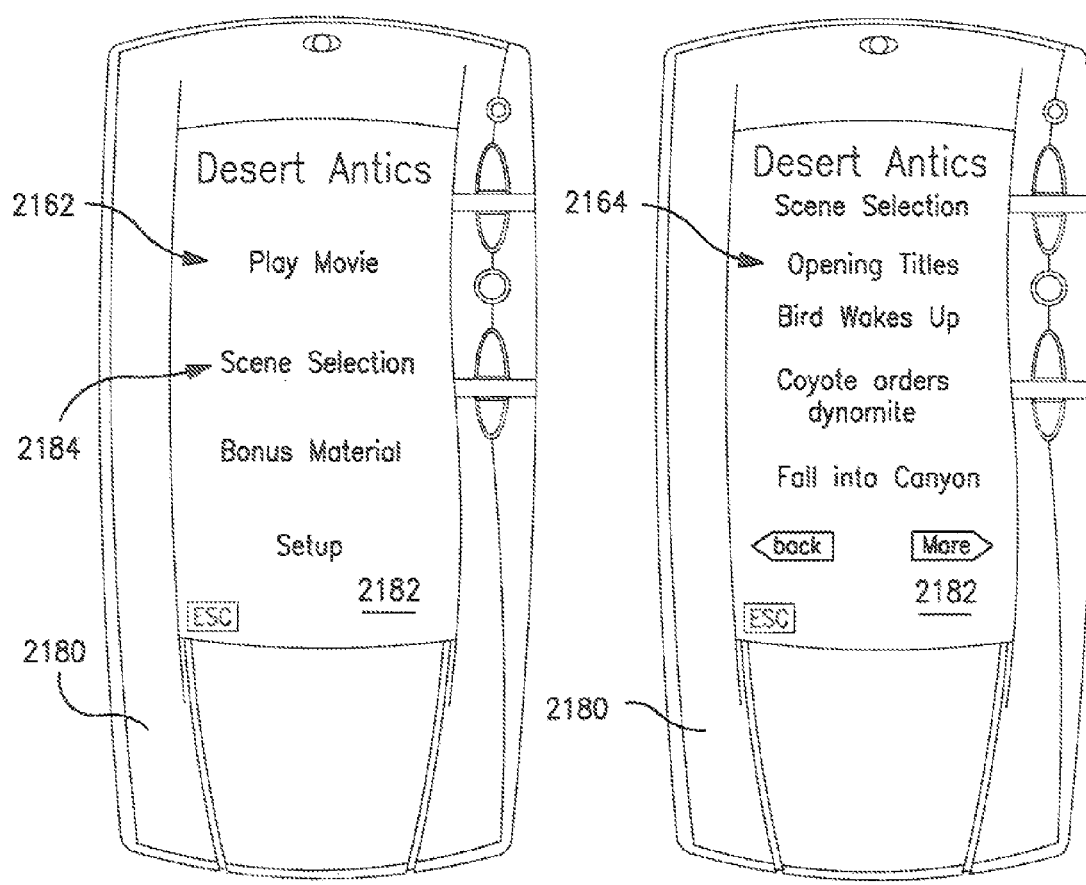
FIG. 20 shows a remote control displaying menu pages corresponding to pages of the tree depicted in FIG. 19.
Figure 21:
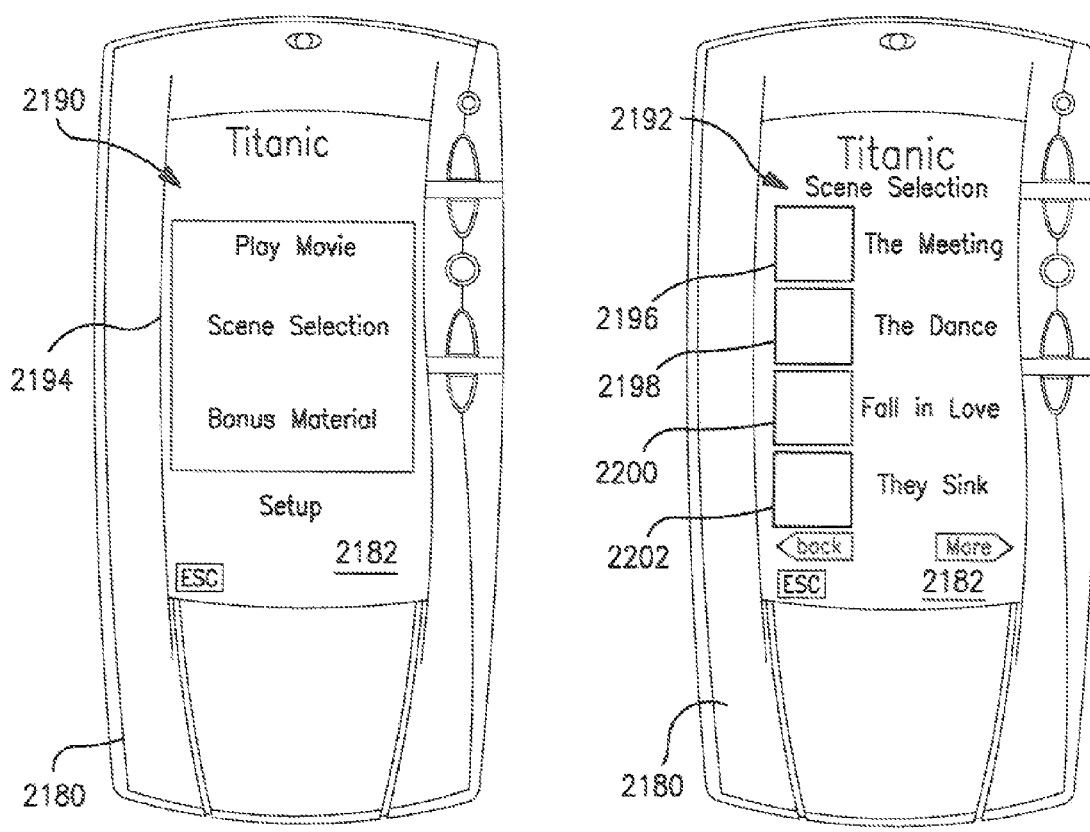
FIG. 21 shows a remote control having menus displaying graphics along with text.

FIGS. 20 and 21 show how such an application including a display menu may appear. FIG. 20 shows a remote control 2180 having a touch screen display 2182. The first two menu pages 2162 and 2164 of the tree 2160 are shown in FIG. 19 as these might appear in a "text only" format. Text screen 2164 may be obtained by touching heading 2184 ("scene selection") on display 2162. FIG. 21 shows portions 2190 and 2192 of a different menu tree which in this case includes black and white graphics 2194-2202 which are downloaded to the remote 2180 to enhance the menu display appearance.

From the foregoing it will be apparent that a primary aspect of the invention is directed toward an improved remote control characterized in that the user interface is enhanced. In one embodiment, the enhancement is achieved by improving the navigation system. In one aspect, the navigation system is improved through use of means for accessing desired media in an expeditious manner. In another embodiment, the user interface is improved through an improved menu display. In a particular embodiment, the navigation system is enhanced through use of an improved display screen.

Accordingly, another aspect of the invention is directed toward means for achieving such user interface enhancements. In a particular embodiment, a microcontroller (a microprocessor combined with memory) is proved with the interface enhancement means.

While the invention has been particularly shown and described with reference to particular embodiments thereof, it will be understood by those skilled in the art that various changes in form and detail may be made therein without departing from the spirit and scope of the invention.

What is claimed is:

1. A system, comprising;
    a consumer electronic device adapted to render a media content; and
    a hand-held, portable device having a touch screen display, a transmitter, a receiver, and a processing unit;
    wherein the processing unit of the hand-held, portable device uses media navigation data as received via the receiver to cause a plurality of command buttons to be displayed in the touch screen display and to automatically define for each of the plurality of command buttons a sequence of navigation commands to be transmitted to the consumer electronic device to cause the consumer electronic device to navigate to and commence a rendering of a corresponding one of a plurality of media content and wherein the processing unit of the hand-held, portable device causes the transmitter to transmit the sequence of navigation commands to the consumer electronic device that was automatically defined for a one of the plurality of command buttons caused to displayed in the touch screen display in response to the one of the plurality of command buttons being interacted with by a user.

2. The system as recited in claim 1, wherein the sequence of navigation commands automatically defined for each of the plurality of command buttons comprises a sequence of navigation commands for causing the consumer electronic device to commence a rendering of a one of a plurality of media content stored on a memory device readable by the consumer electronic device.

3. The system as recited in claim 1, wherein each of the command buttons presents an image corresponding to a one of the plurality of media content.

4. The system as recited in claim 1, wherein each of the plurality of media content comprises a video.

5. The system as recited in claim 2, wherein the memory device readable by the consumer electronic device comprises a digital video disc.

6. The system as recited in claim 1, wherein the transmitter comprises an IR transmitter.

7. A hand-held, portable device, comprising:
- a touch screen display, a transmitter, a receiver, and a processing unit;
- wherein the processing unit of the hand-held, portable device uses media navigation data obtained by a consumer electronic device as received via the receiver to cause a plurality of command buttons to be displayed in the touch screen display and to automatically define for each of the plurality of command buttons a sequence of navigation commands to be transmitted to the consumer electronic device to cause the consumer electronic device to navigate to and commence a rendering of a corresponding one of a plurality of media content and wherein the processing unit of the hand-held, portable device causes the transmitter to transmit the sequence of navigation commands that was automatically defined for a one of the plurality of command buttons caused to displayed in the touch screen display in response to the one of the plurality of command buttons being interacted with by a user.

8. The hand-held, portable device as recited in claim 7, wherein the sequence of navigation commands automatically defined for each of the plurality of command buttons comprises a sequence of navigation commands for causing the consumer electronic device to commence a rendering of a one of a plurality of media content stored on a memory device readable by the consumer electronic device.

9. The hand-held, portable device as recited in claim 7, wherein each of the command buttons presents an image corresponding to a one of the plurality of media content.

10. The hand-held, portable device as recited in claim 7, wherein each of the plurality of media content comprises a video.

11. The hand-held, portable device as recited in claim 8, wherein the memory device readable by the consumer electronic device comprises a digital video disc.

12. The hand-held, portable device as recited in claim 7, wherein the transmitter comprises an IR transmitter.

13. The hand-held, portable device as recited in claim 7, wherein the media navigation data is obtained directly from the memory device.

14. The system as recited in claim 1, wherein the media navigation data is obtained directly from the memory device.

* * * * *